J. C. POTTER.
TURRET SLIDE OPERATING MECHANISM FOR AUTOMATIC TURRET LATHES.
APPLICATION FILED JAN. 31, 1911.

1,040,751.

Patented Oct. 8, 1912.

4 SHEETS—SHEET 1.

Witnesses:
Jas. E. Hutchinson
F. Wm. Ernst

Inventor
James C. Potter,
by Chas. J. Williamson
Attorney

J. C. POTTER.
TURRET SLIDE OPERATING MECHANISM FOR AUTOMATIC TURRET LATHES.
APPLICATION FILED JAN. 31, 1911.

1,040,751.

Patented Oct. 8, 1912.

4 SHEETS—SHEET 4.

UNITED STATES PATENT OFFICE.

JAMES CHARLES POTTER, OF PROVIDENCE, RHODE ISLAND.

TURRET-SLIDE-OPERATING MECHANISM FOR AUTOMATIC TURRET-LATHES.

1,040,751.  Specification of Letters Patent.  Patented Oct. 8, 1912.

Application filed January 31, 1911. Serial No. 605,318.

*To all whom it may concern:*

Be it known that I, JAMES C. POTTER, of Providence, in the county of Providence, and in the State of Rhode Island, have invented a certain new and useful Improvement in Turret-Slide-Operating Mechanism for Automatic Turret-Lathes, and do hereby declare that the following is a full, clear, and exact description thereof.

In automatic turret lathes, as commonly constructed, in which the reciprocation of the turret slide is produced by a cam device, a revolving drum has been employed having attached to its periphery series of cam plates. For each turret tool a pair of cam plates is required, one acting to move the turret slide in one direction and the other in the opposite direction. There are certain important practical objections to this cam drum arrangement which of necessity inhere in the construction, such for example, as great diameter of the drum and the difficulty of use of an angle of cam faces which will easily impart the desired longitudinal movement to the turret slide.

The object of my invention is to provide turret slide moving means which will be free from the practical objections noted and which will result in other important advantages to machines of the class to which my invention pertains.

To the end, therefore, of providing important improvements in the art of automatic turret lathes, my invention consists in the mechanism constructed substantially as hereinafter specified and claimed.

Figure 1:
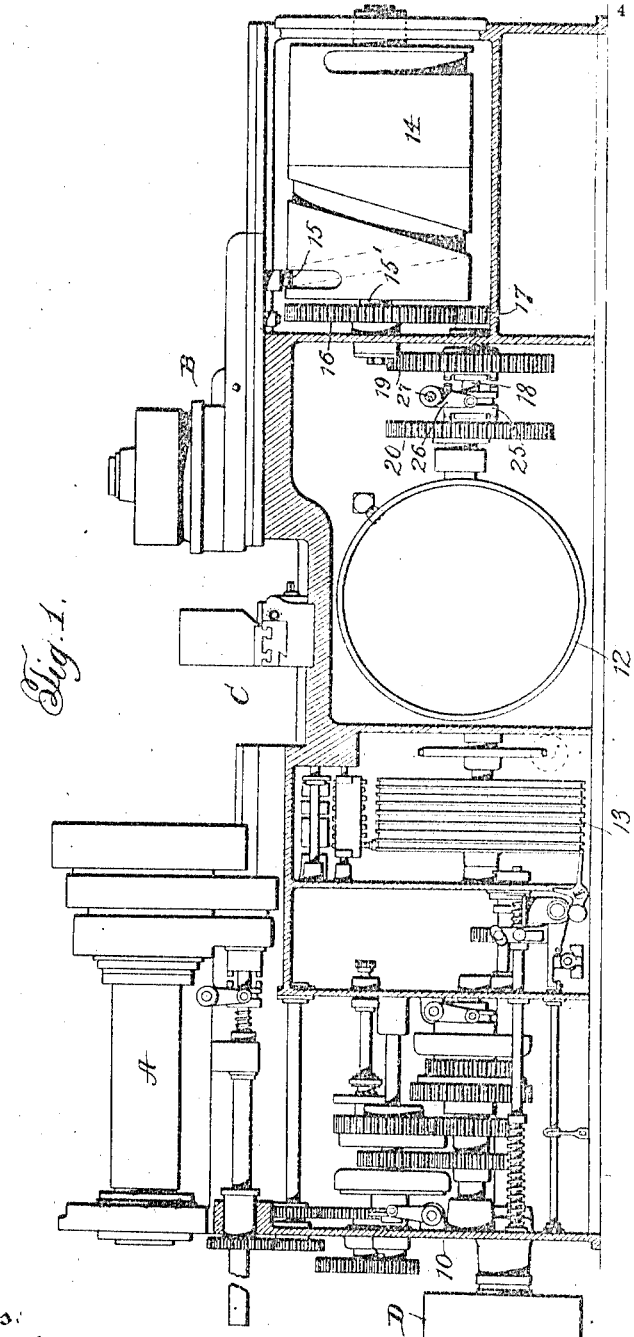
Figure 2:
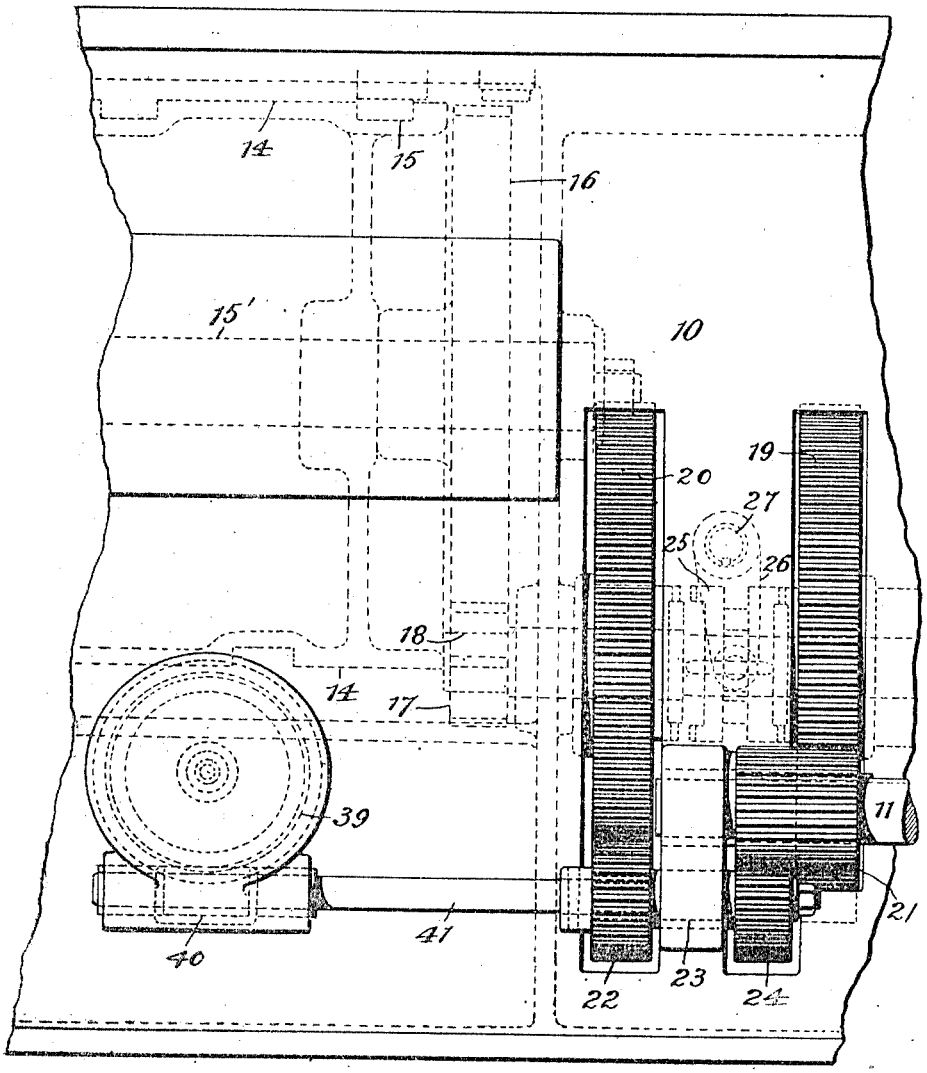
Figure 3:
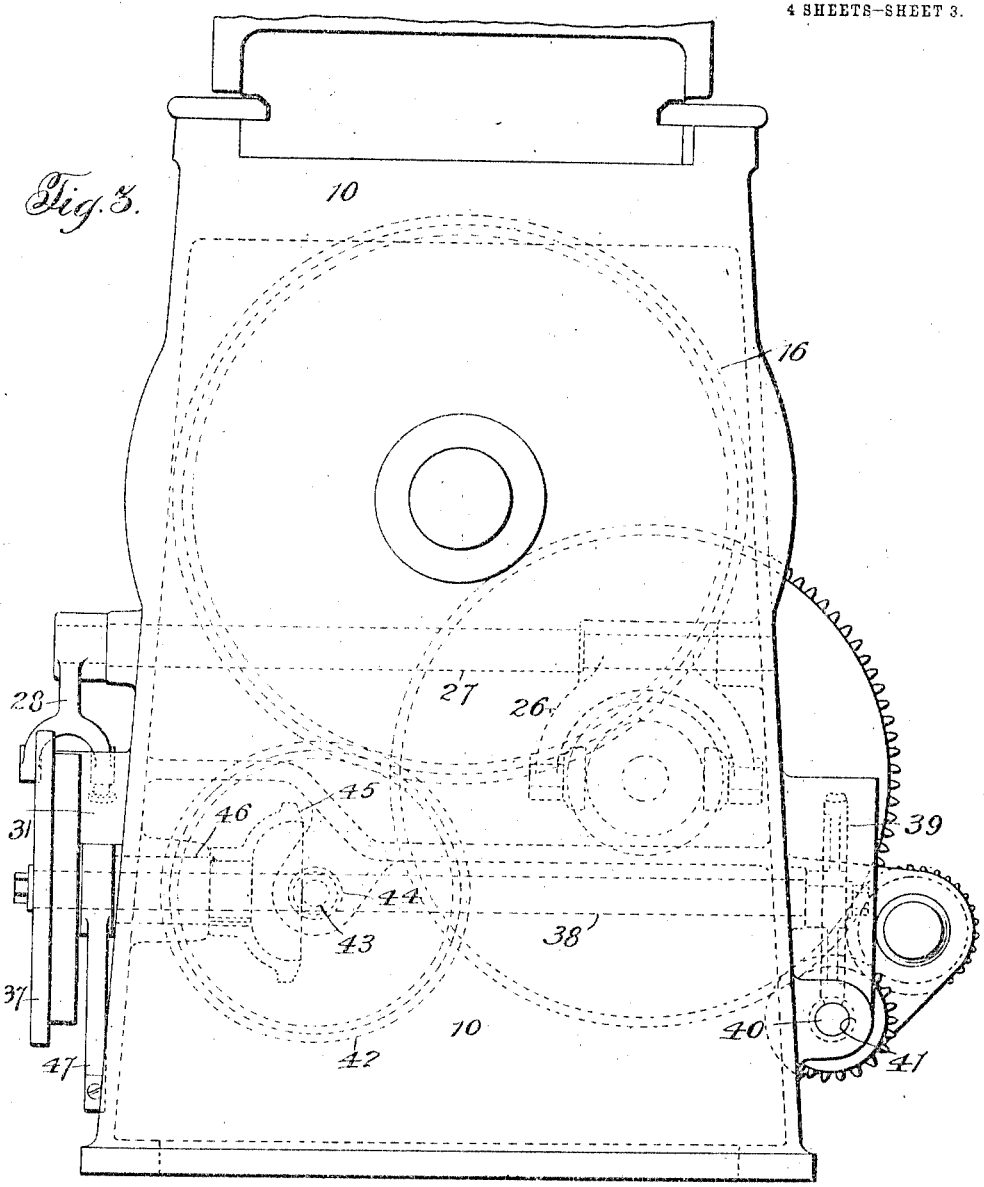
Figure 4:
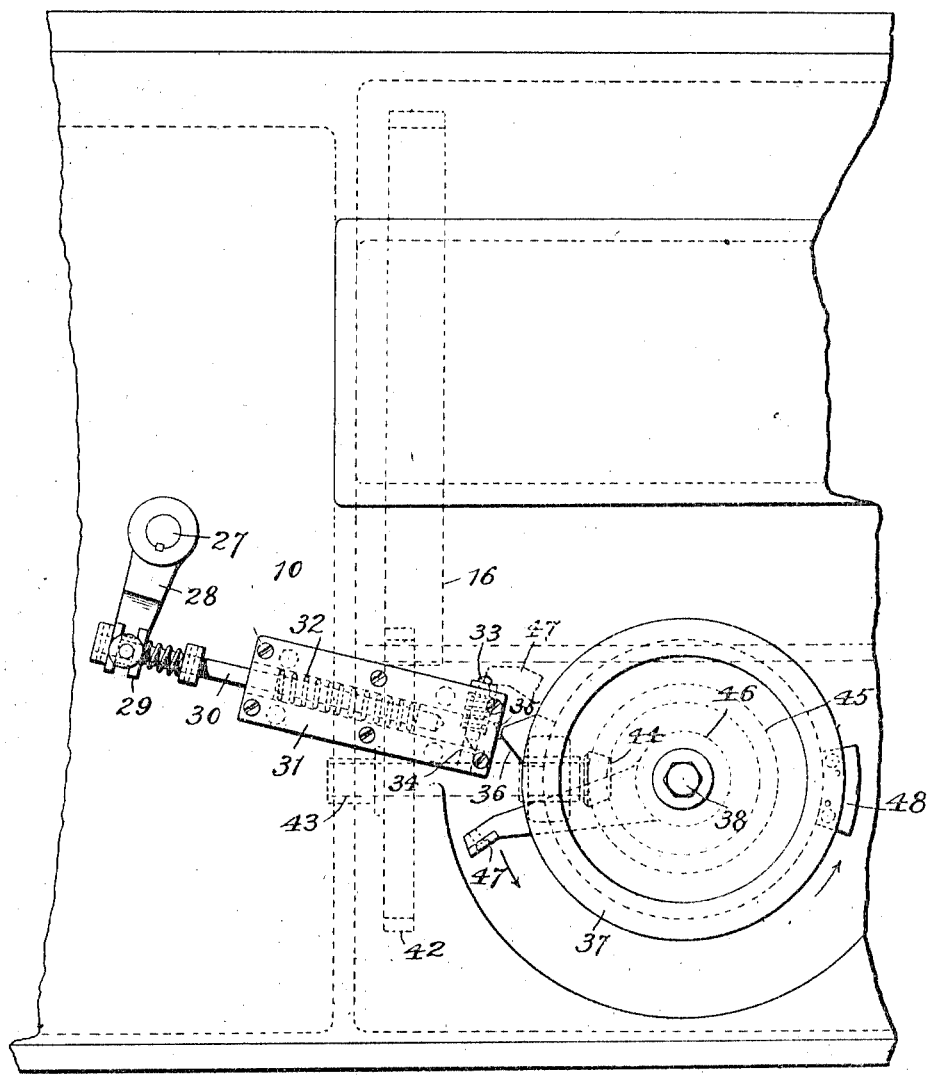

In the accompanying drawings—Figure 1 is a view partly in side elevation and partly in longitudinal section of an automatic turret lathe embodying my invention; Fig. 2 a rear elevation of a portion of the machine, the head stock end being omitted; Fig. 3 an end elevation; Fig. 4 a detail view showing the cam drum reversing mechanism.

In the embodiment of my invention illustrated in the drawings, I show an automatic turret lathe which comprises a chuck carrying spindle A mounted in bearings upon the head stock on a frame 10, a turret slide B reciprocable toward and from the chuck in ways on the frame 10 and a cross slide C mounted on the frame 10, all of which parts may be of usual or any desired construction. Power to operate the machine is applied to a band wheel D on a main driving shaft E. Suitable trains of gearing, not necessary to be described, transmit motion from the main driving shaft to the spindle A and also to a feed shaft 11 located at the rear of the machine from which shaft power is taken by suitable gearing to revolve the cross slide reciprocating cam drum 12 and a speed and feed controlling dog wheel 13 as well as the turret slide reciprocating cam drum 14.

The turret slide operating cam drum 14 is of cylindrical form and in its periphery it has a cam groove or slot that traverses in a substantially spiral or helical course the drum from end to end and terminating at each end in a portion that is at right angles to the drum axis, so that when the usual turret slide stud or roller 15 is in engagement with such portions no movement of the turret slide will take place, but movement is imparted to the turret slide only when the turret slide roller or stud is being acted upon by the intermediate obliquely extending portions of said cam groove. As must be evident to effect the movement of the turret slide alternately in opposite directions, the direction of revolution of the cam drum 14 must be reversed. Inasmuch as the continuous substantially spiral or helical form of cam groove enables any number of revolutions of the drum 14 in a given direction to impart movement to the turret slide in one direction, it will be seen that according to the number of revolutions which it may be deemed desirable to impart to the drum, its diameter can be comparatively small, and any reduction in diameter being compensated for by increase in length of the drum it will be apparent that since increase in length of the drum is unobjectionable as compared with increase in diameter of the drum (which increase in diameter means increased height of the machine) my new construction of drum is of marked superiority over the common type hereinbefore referred to, because, with the same angle of cam a drum of much larger diameter is required than mine. With my new construction without any substantial increase in diameter, I can give less obliquity or inclination to the cam so as to secure an easier action thereof on the turret slide.

The cam drum 14, which as a matter of convenience of construction may be of several sections is mounted upon a shaft 15 supported in suitable bearings in the frame 10 and at its inner end there is a gear 16 keyed to the shaft to revolve the same and the drum with which gear meshes a pinion 17 on a short shaft 18. Loose on the shaft 18 there are two gears 19 and 20, respectively, either of which at a time may be clutched to the shaft 17 so as to revolve the shaft 17 in either direction and thus revolve the drum 14 in either direction. The gear 19 meshes with a gear 21 on the feed shaft 11, so that the gear 19 thus receives motion from the feed shaft 11 in one direction and the gear 20 meshes with a pinion 22 on a short shaft 23 having a pinion 24 which meshes with the feed shaft pinion 21 and thus the gear 20 is revolved from the feed shaft in the opposite direction from the direction of revolution of the gear 19. It will, therefore, be evident that by the alternate clutching of the gears 19 and 20 to the shaft 18, the cam drum 14 will be revolved in one direction or the other from the feed shaft 11.

Situated between the two gears 19 and 20 on the shaft 18 is a double clutch collar 25 which is applied to the shaft 18 and is engaged by a yoke 26 on a rock shaft 27 that extends from front to back of the machine so that by the oscillation of said rock shaft 27 one gear or the other may be clutched to the shaft 18 and thus the direction of revolution of the cam drum 14 determined. On the end of the rock shaft 27 at the front of the machine is a crank arm 28 that engages an annularly grooved spring pressed collar 29 on a longitudinally reciprocating rod or plunger 30 slidably supported in a box or bracket 31 secured to the machine frame 10, within which box 31, and encircling a portion of the rod 30 therein, is a coil spring 32 which bears upon one end of the shoulder of the rod 30 and tends to move the rod 30 in a direction to rock the shaft 27 in the direction to throw the clutch collar 25 into engagement with the gear 20. When the rod 30 is moved in the direction in opposition to the spring 32, the clutch collar 25 is thrown into engagement with the gear 19 and when such is the case the clutch operating rod 30 is latched in position against the pressure of its spring 32 by a spring pressed latch bolt 33 extending transversely of the rod 30 in the box 31 which latch 33 has a nose that engages a shoulder 34 on the head of the rod 30. The head of the rod 30 has a bevel nose 35 which projects beyond the box 31 in the path of a cam plate 36 projecting from the periphery of a wheel or disk 37 which is secured to a shaft 38 that extends from front to rear of the machine and at the back of the machine has keyed to it a worm gear 39 which meshes with a worm 40 on a shaft 41 which is an extension or prolongation of the pinion shaft 23 which receives its motion from the feed shaft 11. It will thus be seen that the cam carrying disk or wheel 37 receives its motion from the feed shaft 11 and thus the movement of the rod 30 in the direction to throw the clutch 25 into position for the forward feed rotation of the drum 14 is produced from the feed shaft 11. The clutch throwing disk or wheel 37 rotates continuously in the same direction.

The reversal of the direction of revolution of the drum 14 for the return and the turret revolving motion of the turret slide is accomplished by devices that receive their movement from the drum 14, so as to make it certain that the feeding revolution of the drum will always be stopped at exactly the same position of the drum, the stoppage of the drum preliminary to the reversal of its revolution occurring preferably for a brief interval before the reversal of revolution of the drum before return motion of the turret slide takes place. To accomplish this result a gear wheel 42 is meshed with the drum gear 16 and upon the shaft 43 carrying the gear 42 is a bevel pinion 44 which meshes with a bevel gear 45 upon a hollow shaft 46 placed concentric with the disk shaft 38, and on said hollow shaft 46 at the inner side of the disk 37 is a radial finger or arm 47 whose outer extremity is adapted by the revolution of the finger or arm to engage the outer end of the latch 33 which holds the clutch operating rod 30 against the moving tendency of the spring 32 and thereby the latch 33 is moved to release the rod 30 and permit its actuating spring 32 to act. As the drum 40 reverses its direction of revolution, the releasing arm 47, of course oscillates and its path of movement is from the latch engaging position indicated in dotted lines in Fig. 4 to the position shown in full lines in Fig. 4 which is enough less than a complete revolution to avoid contact with the box or bracket 31. As has just been above pointed out, there is an interval of rest after the stoppage of the drum before the return motion takes place and to secure such stoppage of the drum 14, both gears 19 and 20 must be unclutched from the shaft 18 which, of course, is accomplished by the movement of the clutch collar 25 to a midposition where it will engage neither gear, and this result is secured by permitting the clutch operating rod 30 when its latch 33 is released to move only a part of its throw under the pressure of its spring 32. To obtain such limited movement of the clutch rod 30, the disk or wheel 37 has at a point diametrically opposite the cam 36 a radial projection or lug 48 which is contiguous to the inner or nose end of the rod 30 when the latch 32 is disengaged from said rod, and so long as there is contact between said nose and said projection 48, the clutch collar 25 is maintained in its position and no motion of the cam drum 14 takes place. As soon, however, as by the continued revolution of the disk 37 a projection 48 passes out of contact with the nose end of the rod 30, the latter is moved its full distance under the pressure of the spring 32 and the clutch collar 25 is thrown into engagement with the gear 20, and the reverse revolution of the drum 14 takes place for imparting the return and the turret revolving motion to the turret slide. The interval which occurs between the shifting of the clutch to a neutral position to stop the drum 14 and its shifting the rest of the distance to reverse, allows for all slippage of the clutch that might occur at either end, and thus prevents disturbance of the proper timing of the parts.

The lands or those end portions of the cam groove that are at right angles to the drum axis, and so produce no movement of the turret slide, are the parts of the cam groove that are engaged by the turret slide stud when shifting of the clutch from engagement with one of the gears on shaft 17 to the other takes place, and hence the drum is not acting on the slide and under strain from that cause. From this it follows that the shifting of the clutch takes place under conditions of considerable reduction of strain or pressure on the clutch as combined with what would be the case were the drum doing work at the time of shifting of the clutch.

As the reversing of the revolution of the drum is controlled by the disk 37 which receives its motion from the feed shaft 11, such reversal is certain to occur always in proper time relation with the cross slide C and the dog wheel 13, because the cross slide drum 12 and the dog wheel 13 also receive their motion from the feed shaft 11. The cross slide tools, it may be remarked, perform their work during the dwell which results from the presence of the turret slide stud in the lands of the cam groove or drum 14.

The one cam groove of the drum 14 reciprocates the turret slide for each tool or station of the turret and the cam drum makes, in the machine illustrated, two revolutions for each tool, one revolution for the advance movement of the tool and the other revolution for its return movement. Variations of feed are secured by varying the speed of revolution of the feed shaft 11 by automatic mechanism such as that which is the subject of my pending application for patent No. 605,817, filed Jan. 31, 1911.

Having thus described my invention what I claim is—

1. In a turret lathe, the combination of a turret slide, and a slide reciprocating drum having a single cam of a helical or substantially helical form extending more than one turn around the drum with a terminal portion at right angles to the axis of the revolution of the drum, such terminal portion being at the end of the cam where the completion of the tool-feeding movement occurs, and means to reverse the direction of revolution of the drum after the cam-engaging member of the slide has entered into engagement with said terminal portion.

2. In a turret lathe, the combination of a turret slide, a slide reciprocating drum having a single cam of a helical or substantially helical form extending more than one turn around the drum with terminal portions at right angles to the axis of revolution of the drum, and means to reverse the direction of revolution of the drum at each reciprocation of the slide.

3. In a turret lathe, the combination of a turret slide, and a slide reciprocating drum having a single cam of a helical or substantially helical form extending more than one turn around the drum with a terminal portion at right angles to the axis of the revolution of the drum, such terminal portion being at the end of the cam where the completion of the tool-feeding movement occurs, means to reverse the direction of revolution of the drum after the cam-engaging member of the slide has entered into engagement with said terminal portion, a cross slide, cross slide moving mechanism, and means to cause the reversal of revolution of the drum in a predetermined time relation to the movements of the cross slide.

4. In a turret lathe, the combination of a turret slide, a reversible slide reciprocating drum, a feed shaft geared to the drum, automatic reversing mechanism, and automatic means controlling the reversing mechanism geared to the feed shaft.

5. In a turret lathe, the combination of a turret slide, a reversible slide reciprocating drum, a feed shaft geared to the drum, automatic stopping and reversing mechanism, and automatic means controlling said stopping and reversing mechanism geared to the drum and to the feed shaft, respectively.

6. In a turret lathe, the combination of a turret slide, a reversible slide reciprocating drum, a feed shaft gearing between the feed shaft and said drum for revolving the drum in either direction, reversing mechanism, means for controlling the reversing mechanism receiving motion from the feed shaft, a cross slide, and a power connection between the feed shaft and the cross slide.

7. In a turret lathe, the combination of a turret slide, a reversible slide reciprocating drum, a feed shaft gearing between the feed shaft and said drum for revolving the drum in either direction, reversing mechanism, means for controlling the reversing mechanism receiving motion from the feed shaft, a cross slide, a power connection between the feed shaft and the cross slide, a speed changing dog wheel, and gearing between said dog wheel and said feed shaft.

8. In a turret lathe, the combination of a turret slide, a slide reciprocating drum, a feed shaft, gearing between the feed shaft and the drum, means to stop the revolution of the drum, automatic means for controlling the drum stopping means, deriving motion from the drum.

9. In a turret lathe, the combination of a turret slide, a slide reciprocating drum having an actuating cam, a feed shaft, two trains of gears connecting the feed shaft and the drum for revolving the drum in opposite directions, a clutch controlling said two trains of gears, a reciprocating clutch operating rod, a latch for holding said rod in one position, a disk geared to the feed shaft having cams arranged for successive cooperation with said clutch operating rod, one of said cams acting to move the rod in one direction and the other acting to limit its movements in the opposite direction, and the latch releasing device deriving motion from the drum.

In testimony that I claim the foregoing I have hereunto set my hand.

JAMES CHARLES POTTER.

Witnesses:
JOHN JOHNSTON,
EARLES ROBERTS.